Figure 1:
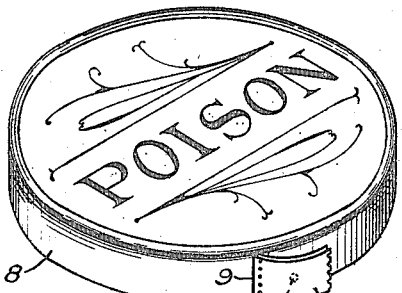

J. W. SEE.
VERMIN POISON MANUFACTURE.
APPLICATION FILED NOV. 16, 1914.

1,161,537.

Patented Nov. 23, 1915.

James W. See
Inventor

Witnesses:
Geo. Johnson
M. S. Belden.

UNITED STATES PATENT OFFICE.

JAMES W. SEE, OF HAMILTON, OHIO.

VERMIN-POISON MANUFACTURE.

1,161,537.

Specification of Letters Patent. Patented Nov. 23, 1915.

Application filed November 16, 1914. Serial No. 872,440.

*To all whom it may concern:*

Be it known that I, JAMES W. SEE, a citizen of the United States, residing at Hamilton, Butler county, Ohio, have invented certain new and useful Improvements in Vermin-Poison Manufacture, of which the following is a specification.

This invention, relating to vermin poison, concerns itself with the form rather than with the character of the poison.

While the improvements are applicable to a large variety of poisons, appropriate to a large variety of vermin, I will herein, with brevity in view, refer to the vermin as roaches, and to phosphorus paste as a typifying poison.

It is a very common thing for a housewife to buy a poison paste in a suitable container, the paste to be applied and used as occasion requires. She will take a food-article, such as a butter cracker, and will dig poison from its receptacle and apply to the cracker, probably half a teaspoonful. In doing this the housewife will be dealing with a troublesome paste, having generally a gluey character, and she is quite apt to do the work unskilfully and when it is done there is a spoon or other implement to clean, and more than likely some of the paste has gotten onto the outside of the receptacle and onto the table on which the work is being done, and some of the paste may have become smeared upon the edges of the cracker instead of being neatly deposited upon its top. All of this work is mussy and it is dangerous. A number of the crackers thus loaded with poison will be distributed at selected points of travel of roaches. This work is generally done rather late at night, and in the morning it will be found, upon examining a certain one of the poison crackers, that a roach has been tempted and has been killed, but it will quite often be found that there is but a single dead roach at this cracker and that any other dead roach must be sought for at another cracker. The reason probably is that one afflicted roach repels other roaches. Considering, for an instant, this single cracker with its load of poison, the cracker is intended for enticing food and the poison, generally combined with something sweet, is intended to form an additional attraction and the death dealing agent, and it is manifest that, while the poisoned cracker has killed but a single roach it represented food enough and poison enough to satisfy a thousand roaches. It is therefore manifest that the system is very wasteful.

When the poisoned crackers have performed their office, which is a very limited one, they must be cleared away and thoroughly destroyed, and before this is done they are an element of danger to small children who recognize them as good crackers loaded with something looking still better.

My present invention aims to avoid entirely all mussiness or the necessity for skilled manipulation on the part of the housewife; to avoid the enormous waste of food and poison incident to the plan above mentioned; to vastly reduce the cost of vermin poisoning; to avoid entirely the usual dangers.

My invention will be readily understood from the following description taken in connection with the accompanying drawing in which:—

Figure 2:
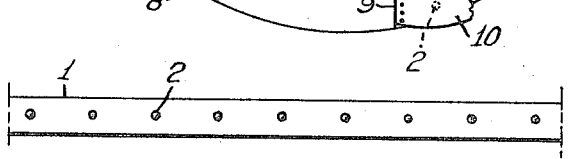
Figure 3:
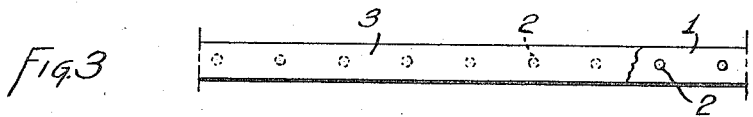
Figure 4:
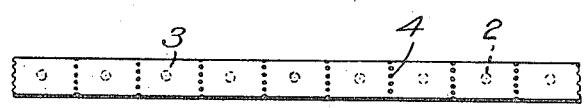
Figure 5:
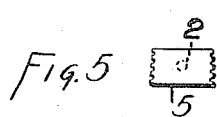
Figure 7:
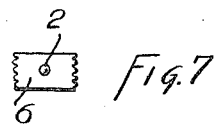
Figure 6:
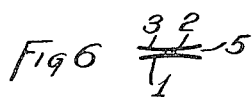
Figure 8:
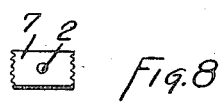

Figure 1 is a perspective view of a package containing my improved form of poison; Figs. 2, 3 and 4, plans of the poison-strip in its various stages of completion; Fig. 5 a plan of a poison-unit severed from the strip; Fig. 6, a side edge view of one of the poison-units; Figs. 7 and 8 the two separate components of the poison-unit.

In the drawing:—1, indicates a narrow strip of paper: 2, small masses of poison-paste deposited thereon at regular intervals along the center of width of the strip: 3, a second strip of paper to be superposed upon the first strip and over the little masses of poison thereon: 4, lines of perforations or equivalent weakenings extending across the dual strip midway between the poison-masses between the strips whereby the dual strip becomes divided into a continuous series of units consisting of two layers of paper with a poison-mass between them: 5, one of these units severed from the end of the strip: 6, the lower component of the poison-unit after the upper component has been lifted from it: 7, the upper component of the poison-unit after it has been lifted from the lower component, a portion of the poison-mass coming along with this separated upper component: 8, a circular box adapted to receive within it a coil of the compound strip: 9, a slot in the edge of the box, parallel with the axis of the box, through which the strip may be withdrawn from the box: and 10, the end of the strip projecting from the box.

The strips of paper will preferably be of such material as possess attractive food characteristics, such for instance, as a paper made from vegetable fiber, as rice or other straw, washed to neutrality after pulping, and free from sizing likely to be repellant to vermin. It is not essential that the paper have food qualities, but it is of importance that it be not repellant. The poison-masses may, as an illustration, be formed of sugar for vermin attracting body, phosphorus for poison, and glycerin as vehicle and softening agent.

The poison-masses having been deposited upon the lower strip, and the upper strip having been applied, the two strips will be stuck together by the poison-masses, but free at other points on their surfaces, and may then be perforated. When poison-units are severed from the strip the two papers of the unit may be pulled apart, leaving a sufficient charge of poison upon each paper. These little poison papers are to be placed wherever thought useful for the accomplishment of their purpose, and they are of such character that when their usefulness is over they may be swept up along with other dirt on the floor, and they are so small that vermin may drag them away to points of seclusion. They offer no temptation to small children.

The housewife may withdraw the end of the strip as far as desired from its box and sever the poison-unit, the perforations facilitating this, and if too much of the strip is pulled out of the box the unneeded portion may be poked back, leaving, however, enough projecting to afford a finger hold. In none of the housewife's operations with this form of poison is there any mussiness or contact with poison, nor is there any danger.

It is to be observed that the overlying strip of paper, aside from its performance in itself carrying poison when separated from its fellow strip, and aside from its performance in protecting the housewife from contact with the poison, serves as a protector of the poison, that is to say, while the second strip is on the first one the poison-masses are protected from the atmosphere which might tend to bring about the drying and hardening of the poison paste and, possibly, the tendency of the poison paste to go into spontaneous combustion. The second strip also, of course, permits of the coiling of the product without danger of the coils sticking together.

I claim:—

1. A vermin poisoning manufacture comprising, a strip of paper having poison-masses deposited thereon at intervals, and a strip of paper overlying the first strip and the poison-masses thereon and free from attachment to the first strip except at the poison-masses, combined substantially as set forth.

2. A vermin poisoning manufacture comprising, a strip of paper formed of food material and having poison-masses deposited thereon at intervals, and a strip of paper overlying the first strip and the poison-masses thereon and free from attachment to the first strip except at the poison-masses, combined substantially as set forth.

3. A vermin poisoning manufacture comprising, a strip of paper having poison-masses deposited thereon at intervals, and a strip of paper overlying the first strip and the poison-masses thereon and free from attachment to the first strip except at the poison-masses, both said strips having lines of weakening extending across them between the poison-masses, combined substantially as set forth.

4. A vermin poisoning manufacture comprising, a strip of paper, poison-masses deposited thereon and having a pasty character to cause them to adhere to the strip, and a second strip of paper overlying the first strip and the poison-masses thereon and adhering to the poison-masses, the two strips being free from attachment to each other except at the poison-masses, combined substantially as set forth.

5. A vermin poisoning manufacture comprising, a strip of paper, poison-masses deposited thereon and having a pasty character to cause them to adhere to the strip, a second strip of paper overlying the first strip and the poison-masses thereon and adhering to the poison-masses, the two strips being free from attachment to each other except at the poison-masses, and lines of weakening extending across the strip between the poison-masses, combined substantially as set forth.

6. As a new article of manufacture, a vermin poison comprising two paper strips having poison-masses disposed between the strips and adhering to both strips, the strips being free of attachment to each other except at the poison-masses, combined substantially as set forth.

7. As a new article of manufacture, a vermin poison comprising two paper strips having poison-masses disposed between the strips and adhering to both strips, the strips being free of attachment to each other except at the poison-masses, and lines of weakening extending across the pair of paper strips between the poison-masses, combined substantially as set forth.

JAMES W. SEE.

Witnesses:
M. S. BELDEN,
GEO. JOHNSEN.